(12) United States Patent
Jayaprakash et al.

(10) Patent No.: US 10,392,111 B2
(45) Date of Patent: Aug. 27, 2019

(54) SEMI-AUTOMATED LOCK ASSEMBLY

(71) Applicant: GOODRICH CORPORATION, Charlotte, NC (US)

(72) Inventors: Narain Jayaprakash, Karnataka (IN); Sayooj Adavalath Puthiyaveettil, Karnataka (IN); Manikandan Mahalingam, Bangalore (IN); Wallace Harold Larson, Jamestown, ND (US)

(73) Assignee: GOODRICH CORPORATION, Charlotte, NC (US)

( * ) Notice: Subject to any disclaimer, the term of this patent is extended or adjusted under 35 U.S.C. 154(b) by 74 days.

(21) Appl. No.: 15/603,050

(22) Filed: May 23, 2017

(65) Prior Publication Data

US 2018/0273177 A1 Sep. 27, 2018

(30) Foreign Application Priority Data

Mar. 23, 2017 (IN) .............................. 201711010272

(51) Int. Cl.
*B60P 7/13* (2006.01)
*B64D 9/00* (2006.01)

(52) U.S. Cl.
CPC ................ *B64D 9/003* (2013.01); *B60P 7/13* (2013.01)

(58) Field of Classification Search
CPC .... B64D 9/003; B64D 9/00; B64D 2009/006; B64D 1/12; B60P 7/13; B60P 7/132; B60P 7/0892; B60P 3/1075; B60P 3/1066; B60P 7/08; B60P 1/00; B60P 7/0815

USPC ........ 410/69, 77, 80, 701, 94, 76, 2, 79, 82, 410/72, 96; 414/401, 498, 396, 400, 484, 414/537, 809; 244/118.1, 137.1, 129.4, 244/137.3
See application file for complete search history.

(56) References Cited

U.S. PATENT DOCUMENTS

| | | | | |
|---|---|---|---|---|
| 4,121,789 A * | 10/1978 | Lent | .......................... | B60P 7/06 410/77 |
| 5,011,348 A * | 4/1991 | Jensen | ................... | B64D 9/003 410/69 |
| 5,433,564 A * | 7/1995 | Sundseth | ............... | B64D 9/003 410/77 |
| 5,564,654 A * | 10/1996 | Nordstrom | ............. | B64D 9/003 244/118.1 |
| 6,270,300 B1 * | 8/2001 | Huber | ...................... | B60P 7/13 244/118.1 |
| 6,485,238 B2 * | 11/2002 | Segura | ..................... | B60P 7/13 410/69 |
| 7,435,043 B2 * | 10/2008 | Brekken | ................ | B64D 9/003 410/69 |
| 7,758,290 B2 * | 7/2010 | Boggenstall | ............. | B60P 7/13 244/118.1 |
| 8,596,418 B2 * | 12/2013 | Brendel | ................... | F16N 13/06 184/6.14 |

(Continued)

*Primary Examiner* — D Glenn Dayoan
*Assistant Examiner* — Sunsurraye Westbrook
(74) *Attorney, Agent, or Firm* — Cantor Colburn LLP

(57) ABSTRACT

A semi-automated lock assembly is provided and includes a housing, a pawl rotatably coupled to the housing to occupy and rotate between retracted and erected positions relative to the housing and a torque generating assembly. The torque generating assembly is secured within the housing and is coupled to the pawl to apply torque assist to an erecting rotation thereof without opposing a retracting rotation thereof.

17 Claims, 3 Drawing Sheets

(56) References Cited

U.S. PATENT DOCUMENTS 8,979,450 B2\* 3/2015 Huber .................... B64D 9/003
            248/429
9,540,106 B2\* 1/2017 Huber .................... B64D 9/003

\* cited by examiner

SEMI-AUTOMATED LOCK ASSEMBLY

CROSS-REFERENCE TO RELATED APPLICATIONS

This application claims priority to and the benefit of Indian Patent Application No. 201711010272 filed on Mar. 23, 2017, and all the benefits accruing therefrom under U.S.C. § 119, the content of which is incorporated herein in its entirety by reference.

BACKGROUND

The following description relates to locking assemblies for unit load devices and, more particularly, to a semi-automated lock assembly for a unit load device.

Cargo handling systems are typically used in a variety of applications to move or situate cargo in a particular area or a cargo compartment of a vehicle such as a ship, truck or aircraft. Pawls in lock assemblies are provided in such cargo handling systems to lock unit load devices, such as pallets or containers, within cargo compartments. Often, design parameters and operating conditions may make operation of the pawls in lock assemblies difficult for operators during loading and unloading of cargo.

BRIEF DESCRIPTION

According to one aspect of the disclosure, a semi-automated lock assembly is provided and includes a housing, a pawl rotatably coupled to the housing to occupy and rotate between retracted and erected positions relative to the housing and a torque generating assembly. The torque generating assembly is secured within the housing and is coupled to the pawl to apply torque assist to an erecting rotation thereof without opposing a retracting rotation thereof.

In accordance with additional or alternative embodiments, the pawl includes an elongate body, restraint surfaces at a distal end of the elongate body and a rotational connection at a proximal end of the elongate body.

In accordance with additional or alternative embodiments, the outer pawl is contained within the housing when occupying the retracted position and extends transversely from the housing when occupying the erected position.

In accordance with additional or alternative embodiments, the pawl includes a gear element at a rotational axis thereof to which the torque generating assembly is coupled.

In accordance with additional or alternative embodiments, the gear element includes a half-moon gear.

In accordance with additional or alternative embodiments, the torque generating assembly includes a motor, a gear which is coupled to the pawl, a shaft by which torque generated in the motor is transmitted to the gear and a one-way clutch operably interposed between the shaft and the gear.

In accordance with additional or alternative embodiments, the one-way clutch includes a roller clutch.

According to another aspect of the disclosure, a semi-automated lock assembly is provided. The semi-automated lock assembly includes a housing, an outer pawl rotatably coupled to the housing to occupy and rotate between first retracted and erected positions of the outer pawl relative to the housing, an inner pawl rotatable coupled to the housing to occupy and rotate between second retracted and erected positions of the inner pawl relative to the housing, an elastic element coupled at first and second ends thereof to the outer and inner pawls, respectively, such that the outer and inner pawls are rotatable together and a torque generating assembly. The torque generating assembly is secured within the housing and is coupled to at least one of the outer and inner pawls to apply torque assist to erecting rotations thereof without opposing retracting rotations thereof.

In accordance with additional or alternative embodiments, the outer pawl includes an elongate body, restraint surfaces at a distal end of the elongate body and a rotational connection at a proximal end of the elongate body and the inner pawl includes an elongate body, restraint surfaces at a distal end of the elongate body and a rotational connection at a proximal end of the elongate body.

In accordance with additional or alternative embodiments, the outer pawl is contained within the housing when occupying the first retracted position and extends transversely from the housing when occupying the first erected position and the inner pawl is contained within the housing when occupying the second retracted position and extends transversely from the housing when occupying the second erected position.

In accordance with additional or alternative embodiments, the inner pawl rotates within the outer pawl and the respective rotations of the outer and inner pawls are opposite in direction.

In accordance with additional or alternative embodiments, the outer pawl includes a gear element at a rotational axis thereof to which the torque generating assembly is coupled.

In accordance with additional or alternative embodiments, the elastic element includes a torsional spring which is coupled at the first end thereof to the outer pawl proximate to a rotational axis of the outer pawl and at the second end thereof to the inner pawl proximate to a rotational axis of the inner pawl.

In accordance with additional or alternative embodiments, the torque generating assembly includes a motor, a gear which is coupled to the at least one of the outer and inner pawls, a shaft by which torque generated in the motor is transmitted to the gear and a one-way clutch operably interposed between the shaft and the gear.

According to another aspect of the disclosure, a semi-automated lock assembly is provided. The semi-automated lock assembly includes a housing, an outer pawl rotatably coupled to the housing to occupy and rotate between first retracted and erected positions of the outer pawl relative to the housing, an inner pawl rotatable coupled to the housing to occupy and rotate between second retracted and erected positions of the inner pawl relative to the housing, an elastic element coupled at first and second ends thereof to the outer and inner pawls, respectively, such that the outer and inner pawls are rotatable together and a torque generating assembly. The torque generating assembly is secured within the housing and is coupled to the outer pawl to apply torque assist to erecting rotations of the outer and inner pawls without opposing retracting rotations of the outer and inner pawls.

In accordance with additional or alternative embodiments, the outer pawl includes an elongate body and is contained within the housing when occupying the first retracted position and extends transversely from the housing when occupying the first erected position, restraint surfaces at a distal end of the elongate body and a rotational connection at a proximal end of the elongate body and the inner pawl includes an elongate body and is contained within the housing when occupying the second retracted position and extends transversely from the housing when occupying the second erected position, restraint surfaces at a distal end of the elongate body and a rotational connection at a proximal end of the elongate body.

In accordance with additional or alternative embodiments, the inner pawl rotates within the outer pawl and the respective rotations of the outer and inner pawls are opposite in direction.

In accordance with additional or alternative embodiments, the outer pawl includes a gear element at a rotational axis thereof to which the torque generating assembly is coupled.

In accordance with additional or alternative embodiments, the elastic element includes a torsional spring which is coupled at the first end thereof to the outer pawl proximate to a rotational axis of the outer pawl and at the second end thereof to the inner pawl proximate to a rotational axis of the inner pawl.

In accordance with additional or alternative embodiments, the torque generating assembly includes a motor, a gear which is coupled to the outer pawl, a shaft by which torque generated in the motor is transmitted to the gear and a one-way clutch operably interposed between the shaft and the gear.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

Aircraft cargo handling systems often have pallet or container locks installed. These locks are typically manually operated which means the operator has to go to the individual lock and erect its pawls by hand. The operator then uses his foot to retract the pawls. Both actions consume time that in turn increases costs to airlines due to their aircraft being required to remain grounded for long durations. Thus, as will be described below, a semi-automated lock assembly is provided for an aircraft cargo handling system. The semi-automated lock assembly will provide torque assist for operators during erecting actions or will accomplish the erecting actions without an operator and will provide no opposition to manual retracting operations.

Figure 1:
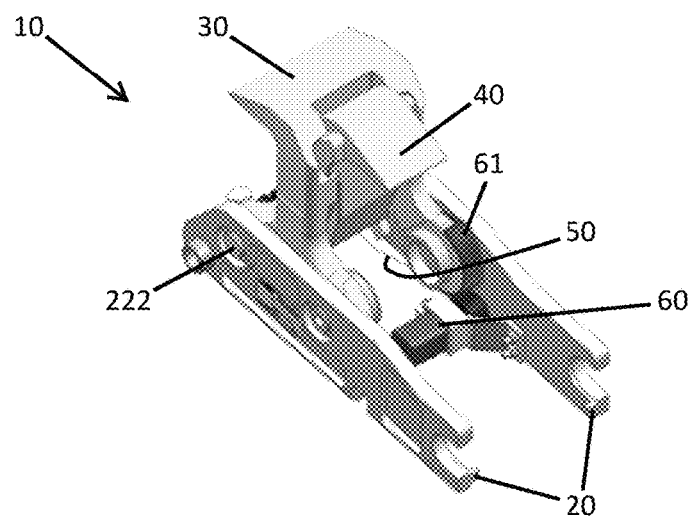
FIG. 1 is a perspective view of a semi-automatic lock assembly in accordance with embodiments.
Figure 2:
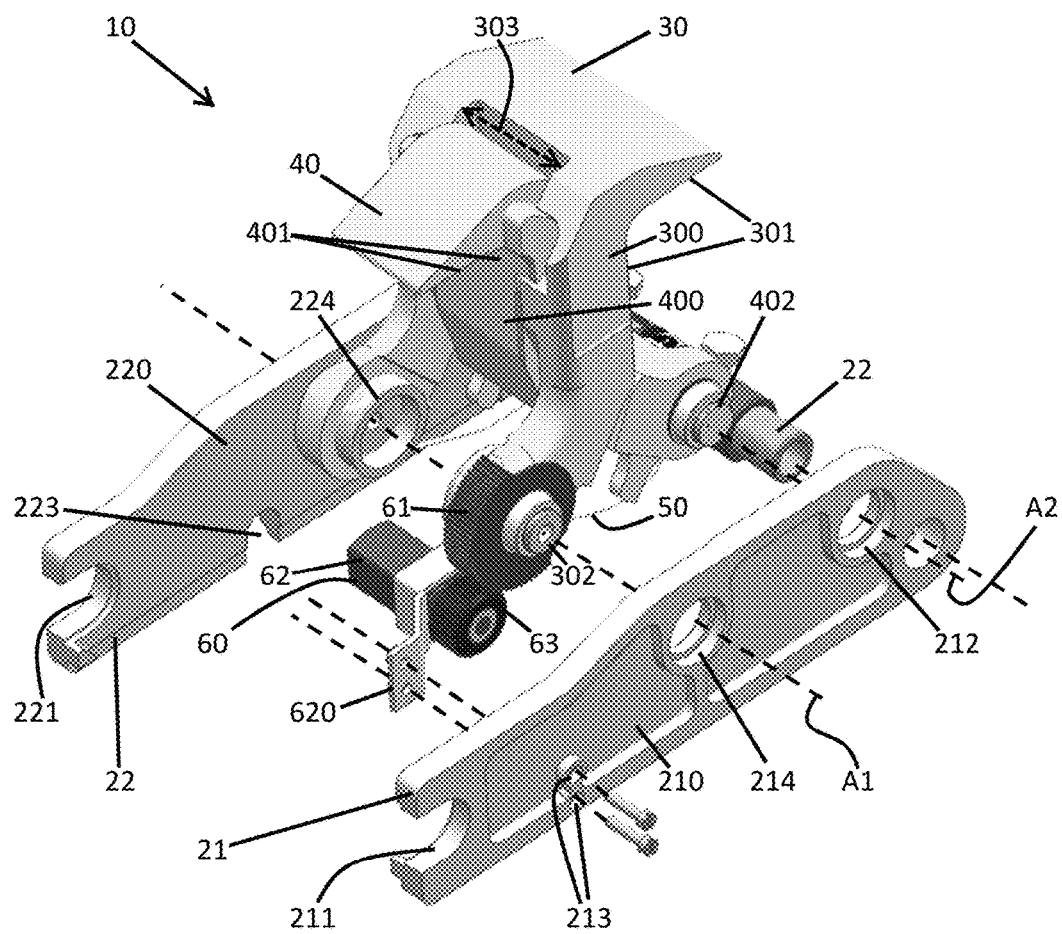
FIG. 2 is a perspective exploded view of the semi-automatic lock assembly of FIG. 1.

With reference to FIGS. 1 and 2, a semi-automated lock assembly 10 is provided for use with a cargo handling system. The semi-automated lock assembly 10 includes a housing 20, an outer pawl 30, an inner pawl 40, an elastic element 50 and a torque generating assembly 60. The outer pawl 30 and the inner pawl 40 can be extended relative to the housing 20 to thereby engage with a unit load device to lock the unit load device in place in a cargo handling system. As used herein, unit load devices are features by which luggage, freight, mail or any other suitable cargo are loadable within a vehicle. The outer pawl 30 and the inner pawl 40 can also be retracted relative to the housing 20 to allow for clearance of cargo to move freely during loading and unloading operations.

The housing 20 generally includes a first side plate 21, a second side plate 22 that is disposed to face the first side plate 21 at a distance and a cross-beam 22 to which the first side plate 21 and the second side plate 22 are secured or attached. The first side plate 21 includes a body 210 that is formed to define a fastener feature 211 at an axial end thereof which is remote from the cross-beam 22, a first through-hole 212 proximate to the cross-beam 22, second through-holes 213 proximate to the fastener feature 211 and a third through-hole 214 between the first through-hole 212 and the second through-holes 213. The second side plate 22 is similar to the first side plate 21 and includes a body 220 that is formed to define a fastener feature 221 at an axial end thereof which is remote from the cross-beam 22, a first through-hole 222 (see FIG. 1) proximate to the cross-beam 22, an aperture 223 proximate to the fastener feature 221 and a third through-hole 224 between the first through-hole 222 and the aperture 223. The housing 20 may further include a panel body which is locatable along walls or a floor of a cargo area and which is formed to define an interior in which the first side plate 21 and the second side plate 22 are disposable.

The outer pawl 30 includes an elongate outer pawl body 300, transversely oriented restraint surfaces 301 at a distal end of the elongate outer pawl body 300 and a rotational connection 302. The rotational connection 302 is provided at a proximal end of the elongate outer pawl body 300 such that the outer pawl 30 is rotatably coupled to the housing 20 to occupy and rotate between a first retracted position relative to the housing 20 and a first erected position relative to the housing 20. The elongate outer pawl body 300 may include three main components: a central component, a toe component that extends transversely in a first direction from the central component at the distal end and a foot component that extends transversely in a second direction from the central component at the proximal end. The toe component and the central component respectively form the transversely oriented restraint surfaces 301 and the first and second directions are nearly but not completely opposite one another. The central component and the foot component are formed to define an aperture 303.

The rotational connection 302 is provided as a pair of rotational connections that rotatably couple opposite sides of the foot component to the first plate 21 and the second plate 22 at the respective third through-holes 214 and 224. The rotational connection 302 defines a rotational axis A1 of the outer pawl 30 whereby the outer pawl 30 rotates about the rotational axis A1 in a first direction to move from the first retracted position relative to the housing 20 to the first erected position relative to the housing 20 and in a second direction opposite the first direction to move from the first erected position relative to the housing 20 to the first retracted position relative to the housing 20.

The inner pawl 40 includes an elongate inner pawl body 400, transversely oriented restraint surfaces 401 at a distal end of the elongate inner pawl body 400 and a rotational connection 402. The rotational connection 402 is provided at a proximal end of the elongate inner pawl body 400 such that the inner pawl 40 is rotatably coupled to the housing 20 to occupy and rotate between a second retracted position relative to the housing 20 and a second erected position relative to the housing 20. The elongate inner pawl body 400 may include three main components: a central component, a toe component that extends transversely in a first direction from the central component at the distal end and a foot component that extends transversely in a second direction from the central component at the proximal end. The toe component and the central component respectively form the transversely oriented restraint surfaces 401 and the first and second directions are nearly but not completely opposite one another. The central component and the foot component are sized to fit within the aperture 303.

With the central component and the foot component being sized to fit within the aperture 303, the inner pawl 40 can rotate with the outer pawl 40 without the outer pawl 30 and the inner pawl 40 interfering with one another. In addition, when the outer pawl 30 occupies the first erected position relative to the housing 20 and the inner pawl 40 occupies the second erected position relative to the housing 20, the respective central components overlap with one another and the respective toe components extend in substantially opposite directions.

The rotational connection 402 is provided as a pair of rotational connections that rotatably couple opposite sides of the foot component to the first plate 21 and the second plate 22 at the respective first through-holes 212 and 222. The rotational connection 402 defines a rotational axis A2 of the inner pawl 40 whereby the inner pawl 40 rotates about the rotational axis A2 in a second direction to move from the second retracted position relative to the housing 20 to the second erected position relative to the housing 20 and in a first direction opposite the second direction to move from the second erected position relative to the housing 20 to the second retracted position relative to the housing 20.

Figure 3:
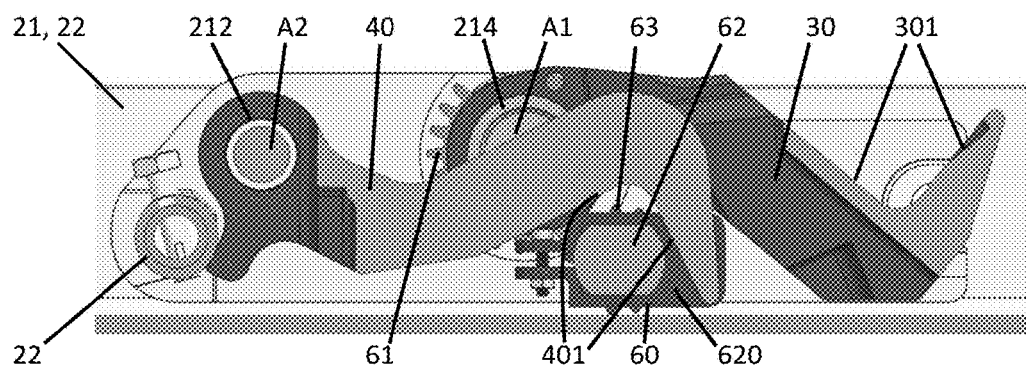
FIG. 3 is a side view of the semi-automatic lock assembly of FIG. 1 with outer and inner pawls in respective retracted positions.
Figure 4:
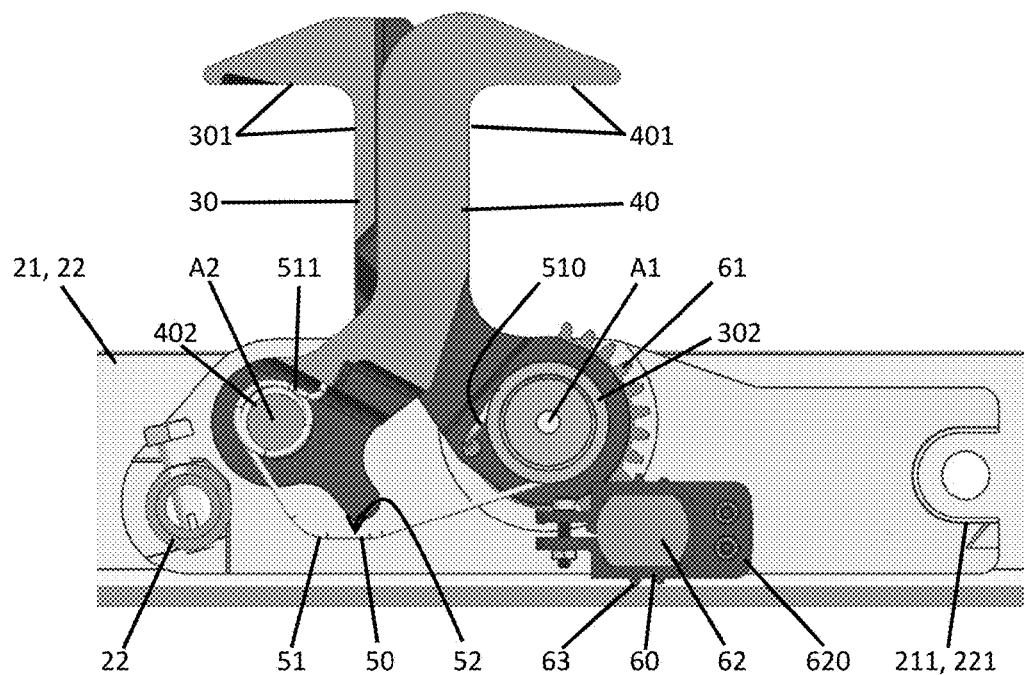
FIG. 4 is a side view of the semi-automatic lock assembly of FIG. 1 with outer and inner pawls in respective erected positions.

With reference to FIGS. 3 and 4, the outer pawl 30 is contained within the housing 20 (i.e., the outer pawl 30 is disposed between the first side plate 21 and the second side plate 22) when the outer pawl 30 occupies the first retracted position as shown in FIG. 3. Conversely, the outer pawl 30 extends transversely from the housing 20 (i.e., the distal end of the outer pawl 30 protrudes from between the first side plate 21 and the second side plate 22) when the outer pawl 30 occupies the first erected position as shown in FIG. 4. Similarly, the inner pawl 40 is contained within the housing 20 (i.e., the inner pawl 40 is disposed between the first side plate 21 and the second side plate 22) when the inner pawl 40 occupies the second retracted position as shown in FIG. 3. Conversely, the inner pawl 40 extends transversely from the housing 20 (i.e., the distal end of the inner pawl 40 protrudes from between the first side plate 21 and the second side plate 22) when the inner pawl 40 occupies the second erected position as shown in FIG. 4.

With reference back to FIGS. 1 and 2 and with additional reference to FIG. 4, the elastic element 50 may be provided as a torsional spring 51 coupled at a first end 510 thereof to the rotational connection 302 of the outer pawl 30 and proximate to the rotational axis A1 of the outer pawl 30 and at the second end 511 thereof to the rotational connection 402 of the inner pawl 40 and proximate to the rotational axis A2 of the inner pawl 40. The couplings between the elastic element 50 and the outer pawl 30 and between the elastic element 50 and the inner pawl 40 are configured such that the outer pawl 30 and the inner pawl 40 are rotatable together.

That is, as the outer pawl 30 rotates between the first retracted position relative to the housing 20 and the first erected position relative to the housing 20, the elastic element 50 causes the inner pawl 40 to correspondingly rotate between the second retracted position relative to the housing 20 and the second erected position relative to the housing 20. Similarly, as the outer pawl 30 rotates between the first erected position relative to the housing 20 and the first retracted position relative to the housing 20, the elastic element 50 causes the inner pawl 40 to correspondingly rotate between the second erected position relative to the housing 20 and the second retracted position relative to the housing 20.

In accordance with embodiments and as shown in FIG. 4, the elastic element 50 may include a biasing curvature 52. This biasing curvature 52 may be configured such that the outer pawl 30 and the inner pawl 40 are biased to remain in the first and second retracted positions, respectively, and to remain in the first and second erected positions, respectively.

With continued reference to FIGS. 1 and 2 and with additional reference to FIGS. 5 and 6, the torque generating assembly 60 is secured within the housing 20 and coupled to at least one of the outer pawl 30 and the inner pawl 40 (hereinafter it will be understood that the torque generating assembly 60 is coupled only to the outer pawl 30) to apply torque assist to erecting rotations of the outer pawl 30 and the inner pawl 40 without opposing retracting rotations of the outer pawl 30 and the inner pawl 40.

Figure 5:
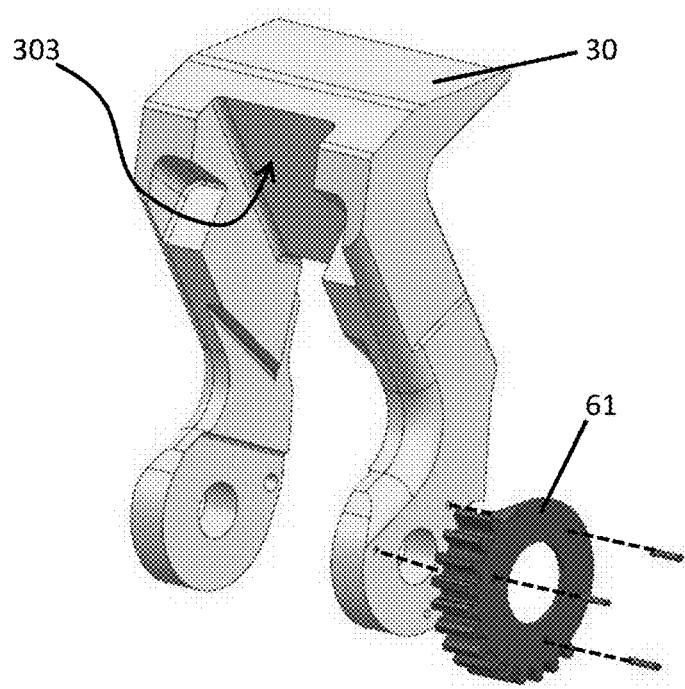
FIG. 5 is a perspective exploded view of an outer pawl and a gear element of the semi-automatic lock assembly of FIG. 1.
Figure 6:
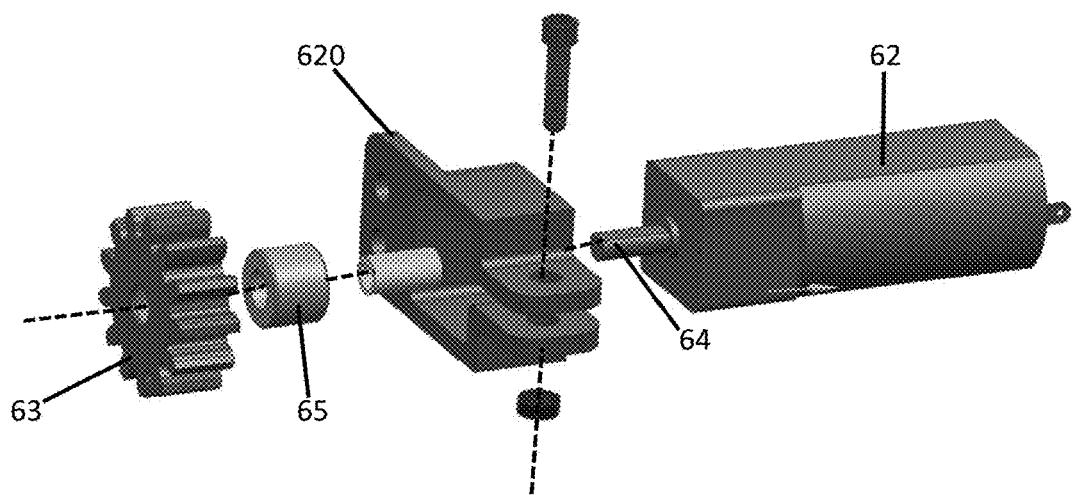
FIG. 6 is a perspective exploded view of a torque generating assembly of the semi-automatic lock assembly of FIG. 1.

As shown in FIG. 5, the outer pawl 30 may include a gear element 61 (e.g., a half-moon gear) that is secured to the foot component at or proximate to the rotational connection 302 and the rotational axis A1. As shown in FIGS. 2 and 6, the torque generating assembly 60 includes a motor 62, a motor housing 620 by which the motor 62 may be affixed to the first plate 21 at the second through-holes 213, a gear 63 (e.g., a pinion gear) which is coupled to and gear-engaged with the gear element 61 of the outer pawl 30, a shaft 64 and a one-way clutch 65 (e.g., a roller clutch). The shaft 64 extends from the motor 62 to the gear 63 and the one-way clutch 65 and serves to transmit torque that is generated in the motor 62 to the gear 63 via the one-way clutch 65. The one-way clutch 65 is operably interposed between the shaft 64 and the gear 63 and provides for torque transfer from the shaft 64 to the gear 63 but not from the gear 63 to the shaft 64.

Thus, as the motor 62 generates torque and turns the shaft 64, the one-way clutch 65 provides for torque transfer to the gear 63. The gear 63 thus causes the gear element 61 to rotate and this in turn causes the outer pawl 30 and the inner pawl 40 to respectively rotate from the first and second retracted positions relative to the housing 20 to the first and second erected positions relative to the housing 20. By contrast, torque associated with respective rotations of the outer pawl 30 and the inner pawl 40 from the first and second erected positions relative to the housing 20 to the first and second retracted positions relative to the housing 20 is prevented from being transmitted from the gear element 61 and the gear 63 to the shaft 64.

With the construction of the torque generating assembly 60, the gear element 61 and the outer pawl 30 described above, respective erecting rotations of the outer pawl 30 and the inner pawl 40 can be completed automatically and with or without operator assistance by an activation of the motor

62. Meanwhile, although the respective retracting rotations of the outer pawl 30 and the inner pawl 40 are or may be controlled entirely manually, the presence of the one-way clutch 65 prevents torque associated with the retracting rotations from being transmitted to the motor 62. As such, the operator causing the respective retracting rotations does not feel any additional opposition to the torque he applies from the motor 62.

The semi-automatic lock assembly 10 described above semi-automates processes of locking of restraints for cargo handling systems and for other similar applications. Use of the semi-automatic lock assembly 10 can lead to a reduction of workforces for airlines and a minimization in turnaround times for loading and unloading of cargo.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A semi-automated lock assembly, comprising:
   a housing;
   a pawl rotatably coupled to the housing to occupy and rotate between retracted and erected positions relative to the housing; and
   a torque generating assembly secured within the housing and comprising a motor, a gear coupled to the pawl, a shaft by which torque generated in the motor is transmitted to the gear and a one-way clutch operably interposed between the shaft and the gear,
   the torque generating assembly being configured to apply the torque generated in the motor as torque assist to an erecting rotation thereof without opposing a retracting rotation thereof.

2. The semi-automated lock assembly according to claim 1, wherein the pawl comprises:
   an elongate body;
   restraint surfaces at a distal end of the elongate body; and
   a rotational connection at a proximal end of the elongate body.

3. The semi-automated lock assembly according to claim 1, wherein the outer pawl is contained within the housing when occupying the retracted position and extends transversely from the housing when occupying the erected position.

4. A semi-automated lock assembly, comprising:
   a housing;
   a pawl rotatably coupled to the housing to occupy and rotate between retracted and erected positions relative to the housing; and
   a torque generating assembly secured within the housing and coupled to the pawl to apply torque assist to an erecting rotation thereof without opposing a retracting rotation thereof,
   wherein the pawl comprises a gear element at a rotational axis thereof to which the torque generating assembly is coupled.

5. The semi-automated lock assembly according to claim 4, wherein the gear element comprises a half-moon gear.

6. The semi-automated lock assembly according to claim 1, wherein the one-way clutch comprises a roller clutch.

7. A semi-automated lock assembly, comprising:
   a housing;
   an outer pawl rotatably coupled to the housing to occupy and rotate between first retracted and erected positions of the outer pawl relative to the housing;
   an inner pawl rotatable coupled to the housing to occupy and rotate between second retracted and erected positions of the inner pawl relative to the housing;
   an elastic element coupled at first and second ends thereof to the outer and inner pawls, respectively, such that the outer and inner pawls are rotatable together; and
   a torque generating assembly secured within the housing and comprising a motor, a gear coupled to at least one of the outer and inner pawls, a shaft by which torque generated in the motor is transmitted to the gear and a one-way clutch operably interposed between the shaft and the gear,
   the torque generating assembly being configured to apply the torque generated in the motor as torque assist to erecting rotations thereof without opposing retracting rotations thereof.

8. The semi-automated lock assembly according to claim 7, wherein:
   the outer pawl comprises an elongate body, restraint surfaces at a distal end of the elongate body and a rotational connection at a proximal end of the elongate body, and
   the inner pawl comprises an elongate body, restraint surfaces at a distal end of the elongate body and a rotational connection at a proximal end of the elongate body.

9. The semi-automated lock assembly according to claim 7, wherein:
   the outer pawl is contained within the housing when occupying the first retracted position and extends transversely from the housing when occupying the first erected position, and
   the inner pawl is contained within the housing when occupying the second retracted position and extends transversely from the housing when occupying the second erected position.

10. The semi-automated lock assembly according to claim 7, wherein the inner pawl rotates within the outer pawl and the respective rotations of the outer and inner pawls are opposite in direction.

11. A semi-automated lock assembly, comprising:
    a housing;
    an outer pawl rotatably coupled to the housing to occupy and rotate between first retracted and erected positions of the outer pawl relative to the housing;
    an inner pawl rotatable coupled to the housing to occupy and rotate between second retracted and erected positions of the inner pawl relative to the housing;
    an elastic element coupled at first and second ends thereof to the outer and inner pawls, respectively, such that the outer and inner pawls are rotatable together; and
    a torque generating assembly secured within the housing and coupled to at least one of the outer and inner pawls to apply torque assist to erecting rotations thereof without opposing retracting rotations thereof,
    wherein the outer pawl comprises a gear element at a rotational axis thereof to which the torque generating assembly is coupled.

12. The semi-automated lock assembly according to claim 7, wherein the elastic element comprises a torsional spring which is coupled at the first end thereof to the outer pawl proximate to a rotational axis of the outer pawl and at the second end thereof to the inner pawl proximate to a rotational axis of the inner pawl.

13. A semi-automated lock assembly, comprising:
a housing;
an outer pawl rotatably coupled to the housing to occupy and rotate between first retracted and erected positions of the outer pawl relative to the housing;
an inner pawl rotatable coupled to the housing to occupy and rotate between second retracted and erected positions of the inner pawl relative to the housing;
an elastic element coupled at first and second ends thereof to the outer and inner pawls, respectively, such that the outer and inner pawls are rotatable together; and
a torque generating assembly secured within the housing and comprising a motor, a gear coupled to the outer pawl, a shaft by which torque generated in the motor is transmitted to the gear and a one-way clutch operably interposed between the shaft and the gear,
the torque generating assembly being configured to apply the torque generated in the motor as torque assist to erecting rotations of the outer and inner pawls without opposing retracting rotations of the outer and inner pawls.

14. The semi-automated lock assembly according to claim 13, wherein:
the outer pawl comprises an elongate body and is contained within the housing when occupying the first retracted position and extends transversely from the housing when occupying the first erected position, restraint surfaces at a distal end of the elongate body and a rotational connection at a proximal end of the elongate body, and
the inner pawl comprises an elongate body and is contained within the housing when occupying the second retracted position and extends transversely from the housing when occupying the second erected position, restraint surfaces at a distal end of the elongate body and a rotational connection at a proximal end of the elongate body.

15. The semi-automated lock assembly according to claim 13, wherein the inner pawl rotates within the outer pawl and the respective rotations of the outer and inner pawls are opposite in direction.

16. A semi-automated lock assembly, comprising:
a housing;
an outer pawl rotatably coupled to the housing to occupy and rotate between first retracted and erected positions of the outer pawl relative to the housing;
an inner pawl rotatable coupled to the housing to occupy and rotate between second retracted and erected positions of the inner pawl relative to the housing;
an elastic element coupled at first and second ends thereof to the outer and inner pawls, respectively, such that the outer and inner pawls are rotatable together; and
a torque generating assembly secured within the housing and coupled to the outer pawl to apply torque assist to erecting rotations of the outer and inner pawls without opposing retracting rotations of the outer and inner pawls,
wherein the outer pawl comprises a gear element at a rotational axis thereof to which the torque generating assembly is coupled.

17. The semi-automated lock assembly according to claim 13, wherein the elastic element comprises a torsional spring which is coupled at the first end thereof to the outer pawl proximate to a rotational axis of the outer pawl and at the second end thereof to the inner pawl proximate to a rotational axis of the inner pawl.

* * * * *